United States Patent
Amirault

(10) Patent No.: US 9,635,796 B1
(45) Date of Patent: May 2, 2017

(54) SHOVEL ASSEMBLY

(71) Applicant: Marcel Amirault, Faimouth, CA (US)

(72) Inventor: Marcel Amirault, Faimouth, CA (US)

( * ) Notice: Subject to any disclaimer, the term of this patent is extended or adjusted under 35 U.S.C. 154(b) by 0 days.

(21) Appl. No.: 15/185,390

(22) Filed: Jun. 17, 2016

(51) Int. Cl.
| *A01B 1/00* | (2006.01) |
| *B25G 1/00* | (2006.01) |
| *A01B 1/02* | (2006.01) |

(52) U.S. Cl.
CPC ............... *A01B 1/026* (2013.01); *B25G 1/00* (2013.01)

(58) Field of Classification Search
CPC ........... A01B 1/026; B25G 1/00; B25G 1/102
USPC ....................... 294/25, 178, 57–59
See application file for complete search history.

(56) References Cited

U.S. PATENT DOCUMENTS

| 2,546,113 | A | * | 3/1951 | Spang | ...................... A01G 1/12 294/25 |
| 4,888,846 | A | | 12/1989 | Natale | |
| D334,515 | S | | 4/1993 | Libra et al. | |
| 5,275,068 | A | * | 1/1994 | Wrench | ..................... A01B 1/22 30/296.1 |
| 5,471,698 | A | * | 12/1995 | Francis | ................... A47L 13/08 15/144.1 |
| 5,498,046 | A | * | 3/1996 | Ridley, Sr. | ............ A01D 51/00 15/257.1 |
| 5,716,087 | A | | 2/1998 | Backich | |
| 5,890,259 | A | * | 4/1999 | Sarac | ....................... A01B 1/00 16/422 |
| 5,937,627 | A | * | 8/1999 | McKittrick | .............. A01B 1/00 172/378 |
| 6,082,795 | A | | 7/2000 | Fornelli | |
| 6,464,272 | B1 | | 10/2002 | Michaud | |
| 6,598,266 | B1 | * | 7/2003 | Elliott | ...................... A01B 1/00 16/426 |
| 8,550,515 | B2 | | 10/2013 | Castillo | |
| 2003/0001400 | A1 | * | 1/2003 | Kelzer | ..................... A01B 1/00 294/57 |

FOREIGN PATENT DOCUMENTS

WO   WO2013184509   12/2013

* cited by examiner

*Primary Examiner* — Dean Kramer

(57) ABSTRACT

A shovel assembly for coupling a shovel to a forearm includes a shovel that may be coupled to a forearm of a user. Thus, the shovel may be manipulated to shovel material. A support is coupled to the shovel. The support may to be secured to the user's forearm. Thus, the shovel is retained on the user's forearm.

7 Claims, 4 Drawing Sheets

SHOVEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to shovel devices and more particularly pertains to a new shovel device for coupling a shovel to a forearm.

BRIEF SUMMARY OF THE INVENTION

An embodiment of the disclosure meets the needs presented above by generally comprising a shovel that may be coupled to a forearm of a user. Thus, the shovel may be manipulated to shovel material. A support is coupled to the shovel. The support may be secured to the user's forearm. Thus, the shovel is retained on the user's forearm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
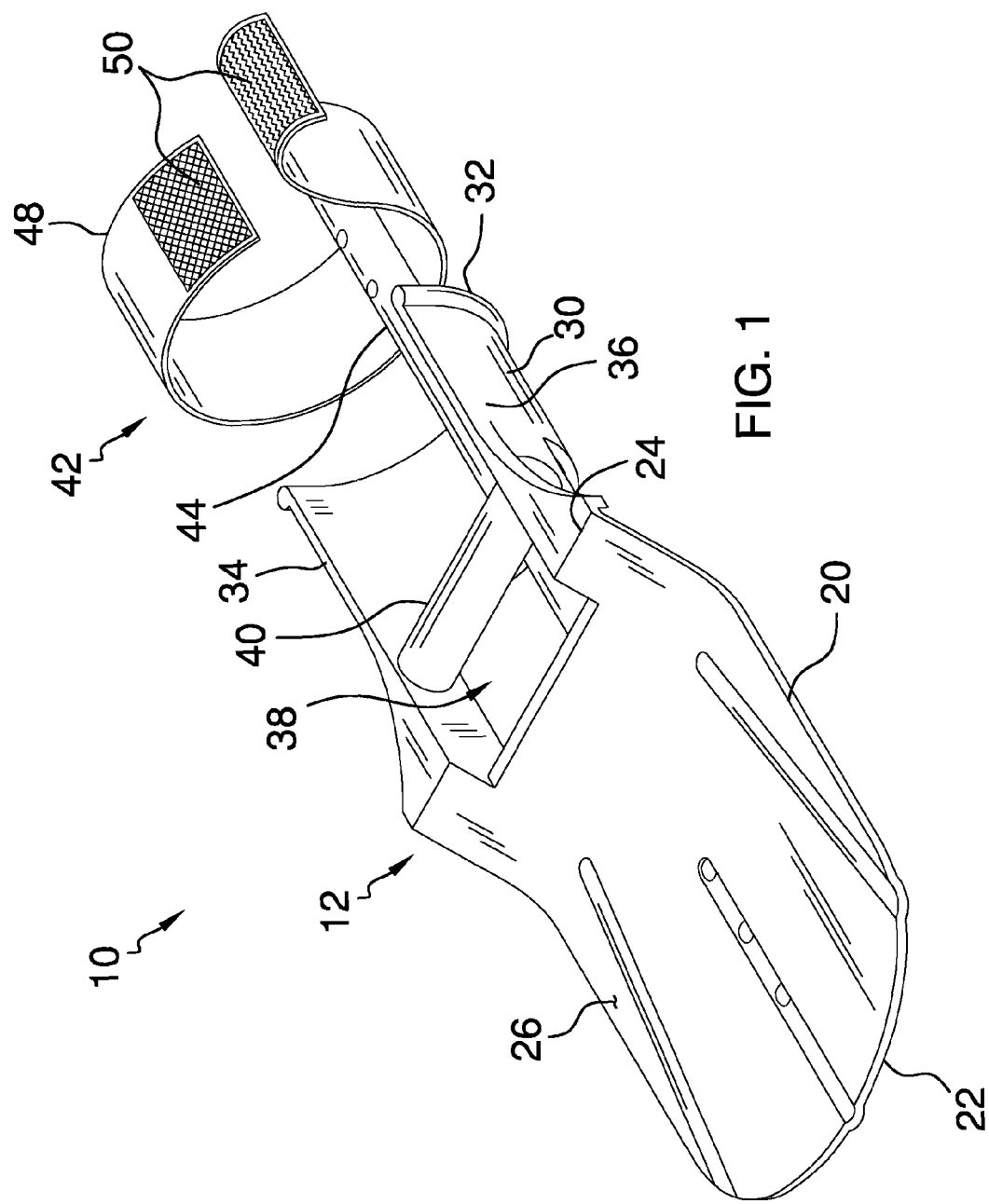
FIG. 1 is a top perspective view of a shovel assembly according to an embodiment of the disclosure.
Figure 2:
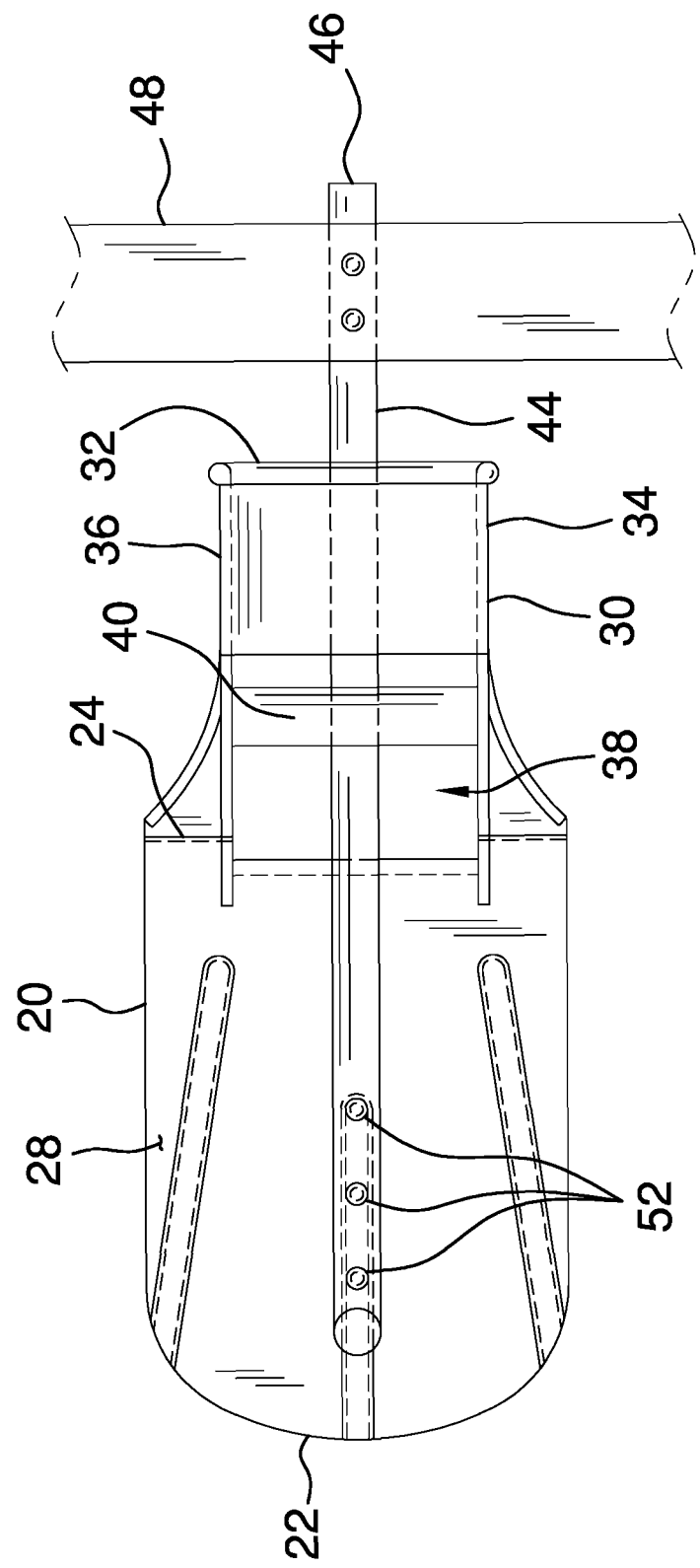
FIG. 2 is a bottom view of an embodiment of the disclosure.
Figure 3:
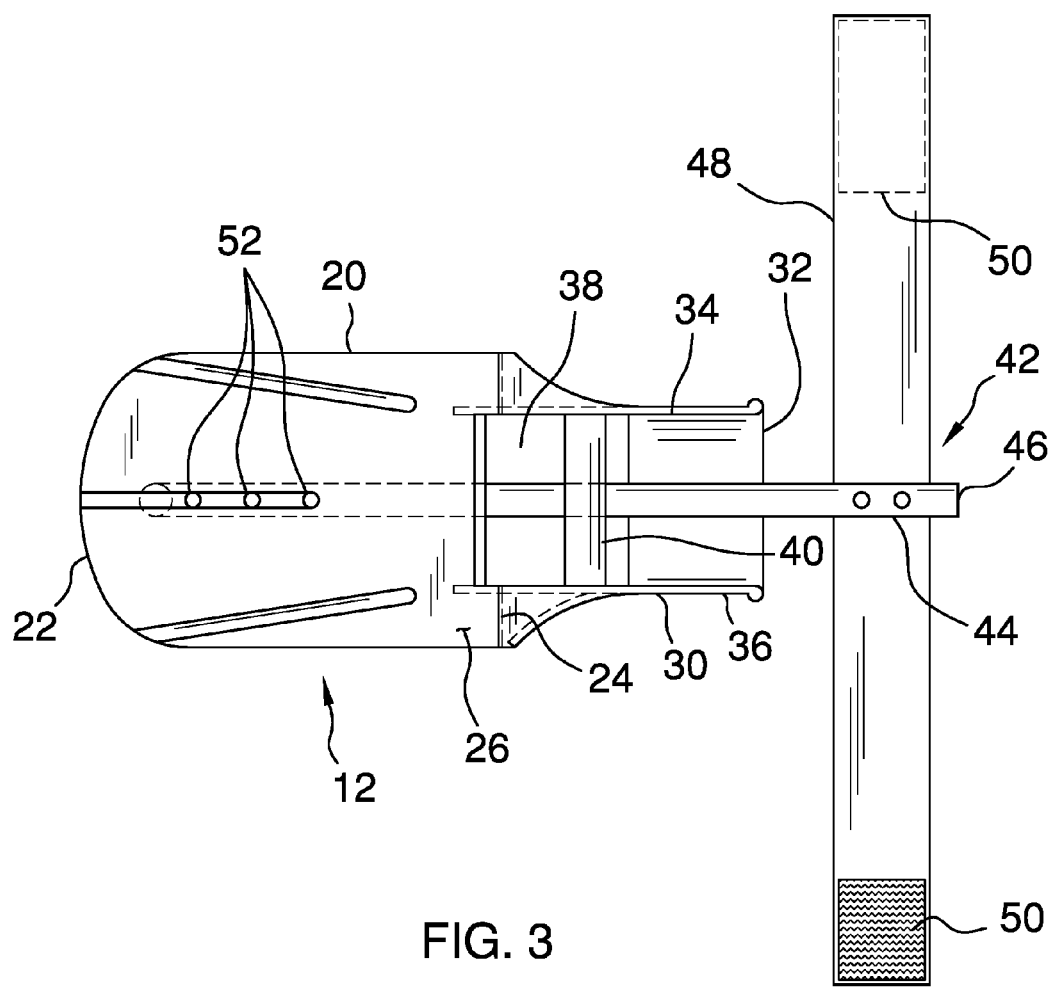
FIG. 3 is a top view of an embodiment of the disclosure.
Figure 4:
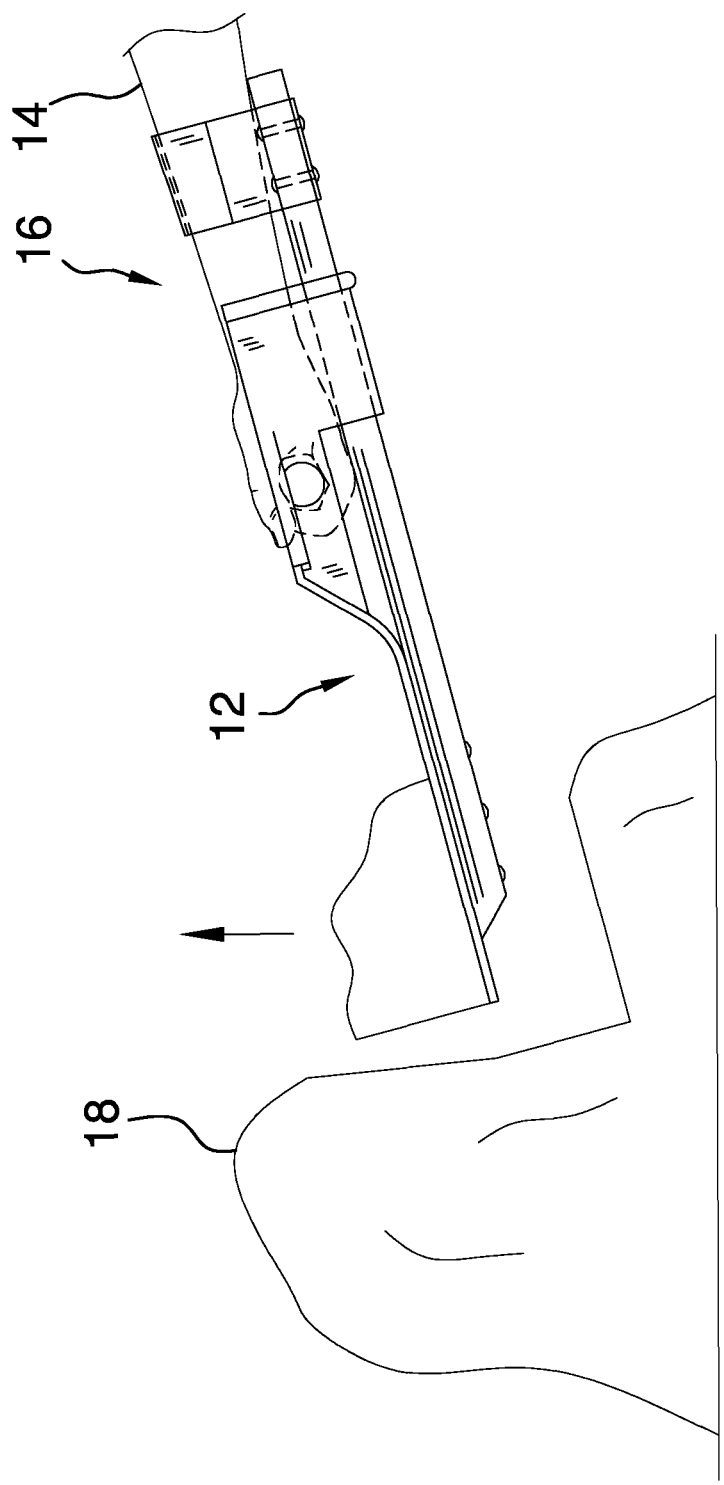
FIG. 4 is a perspective in-use view of an embodiment of the disclosure.

With reference now to the drawings, and in particular to FIGS. 1 through 4 thereof, a new shovel device embodying the principles and concepts of an embodiment of the disclosure and generally designated by the reference numeral 10 will be described.

As best illustrated in FIGS. 1 through 4, the shovel assembly 10 generally comprises a shovel 12 that may be coupled to a forearm 14 of a user 16. Thus, the shovel 12 may be manipulated to shovel material 18. The material 18 may comprise snow or other granular material.

The shovel 12 comprises a blade 20 that has a front edge 22, a back edge 24, a top surface 26 and a bottom surface 28. The front edge 22 may engage the material 18 thereby facilitating the material 18 to be supported on the top surface 26. The shovel 12 curves upwardly adjacent to the back edge 24. The blade 20 may have a length ranging between fifteen cm and twenty five cm.

A saddle 30 is provided and the saddle 30 extends away form the back edge 24 of the blade 20. Thus, the saddle 30 may insertably receive the user's forearm 14. The saddle 30 has a distal edge 32 with respect to the blade 20, a first side 34, a second side 36 and an inwardly facing surface 38. The saddle 30 has an opening 38 extending therethrough. The opening 38 is aligned with the bottom surface 28 of the blade 20. The saddle 30 may have a length ranging between ten cm and fifteen cm.

A grip 40 is coupled to the saddle 30 and the grip 40 may be gripped. The grip 40 extends between the first side 34 and the second side 36 of the saddle 30. The grip 40 is positioned closer to the blade 20 than the distal edge 32 of the saddle 30. The grip 40 may comprise a pipe or the like.

A support 42 is provided. The support 42 is coupled to the shovel 12. The support 42 may be secured to the user's forearm 14. Thus, the support 42 facilitates the shovel 12 to be retained on the user's forearm 14.

The support 42 comprises a rod 44 that is coupled between the saddle 30 and the blade 20. The rod 44 is positioned within the saddle 30 and extends outwardly though the opening 38 in the saddle 30. The rod 44 extends along the bottom surface 28 of the blade 20 and the rod 44 extends outwardly beyond the distal edge 32 of the saddle 30. The rod 44 has a distal end 46 with respect to the saddle 30.

A strap 48 is provided and the strap 48 is coupled to the rod 44. The strap 48 is positioned adjacent to the distal end 46 of the rod 44. Thus, the strap 48 may be wrapped around the user's forearm 14. The strap 48 is matable to itself to secure the support 42 to the user's forearm 14. A pair of complementary couplers 50 may each be coupled to the strap 48. The complementary couplers 50 may engage each other when the strap 48 is wrapped around the user's forearm 14. Each of the complementary couplers 50 may comprise a hook and loop fastener or the like.

A plurality of fasteners 52 is provided. Each of the fasteners 52 extends through the blade 20 and the rod 44. Thus, the rod 44 is coupled to the blade 20. The rod 44 transfers a weight of the material 18 to the user's forearm 14 when the shovel 12 is worn. Each of the fasteners 52 may comprise rivets or the like.

In use, the user's forearm 14 is positioned in the saddle 30 and the strap 48 is wrapped around the user's forearm 14. The grip 40 is gripped and the shovel 12 is manipulated such that the blade 20 engages the material 18. The shovel 12 is manipulated to shovel the material 18. The strap 48 is removed from the user's forearm 14 and the saddle 30 is removed from the user's forearm 14 when shoveling is completed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shovel assembly being configured to be removably coupled to an arm, said assembly comprising:
    a shovel being configured to be coupled to a forearm of a user thereby facilitating said shovel to be manipulated to shovel material, said shovel comprising a blade having a bottom surface, and a saddle having an opening and a distal edge; and
    a support being coupled to said shovel wherein said support is configured to be secured to the user's forearm thereby facilitating said shovel to be retained on the user's forearm, said support comprising a rod being coupled between said saddle and said blade, said rod being positioned within said saddle and extending outwardly though said opening in said saddle, said rod extending along said bottom surface of said blade, said rod extending outwardly beyond said distal edge of said saddle, said rod having a distal end with respect to said saddle.

2. The assembly according to claim 1, wherein said shovel comprises said blade having a front edge, a back edge, and a top surface, said front edge being configured to engage the material thereby facilitating the material to be supported on said top surface, said shovel curving upwardly adjacent to said back edge.

3. The assembly according to claim 2, further comprising said saddle extending away from said back edge of said blade wherein said saddle is configured to insertably receive the user's forearm, said saddle having, a first side, a second side and an inwardly facing surface, said opening being aligned with said bottom surface of said blade.

4. The assembly according to claim 1, further comprising a strap being coupled to said rod, said strap being positioned adjacent to said distal end of said rod wherein said strap is configured to be wrapped around the user's forearm, said strap being matable to itself wherein said strap is configured to secure said support to the user's forearm.

5. The assembly according to claim 4, further comprising a plurality of fasteners, each of said fasteners extending through said blade and said rod such that said rod is coupled to said blade wherein said rod is configured to transfer a load of the material to the user's forearm when said shovel is worn.

6. A shovel assembly being configured to be removably coupled to an arm, said assembly comprising:
    a shovel being configured to be coupled to a forearm of a user thereby facilitating said shovel to be manipulated to shovel material, wherein said shovel comprises a blade having a front edge, a back edge, a top surface and a bottom surface, said front edge being configured to engage the material thereby facilitating the material to be supported on said top surface, said shovel curving upwardly adjacent to said back edge;
    a support being coupled to said shovel wherein said support is configured to be secured to the user's forearm thereby facilitating said shovel to be retained on the user's forearm;
    a saddle extending away form said back edge of said blade wherein said saddle is configured to insertably receive the user's forearm, said saddle having a distal edge with respect to said blade, a first side, a second side and an inwardly facing surface, said saddle having an opening extending therethrough, said opening being aligned with said bottom surface of said blade; and
    a grip being coupled to said saddle wherein said grip is configured to be gripped, said grip extending between said first side and said second side of said saddle, said grip being positioned closer to said blade than said distal edge of said saddle.

7. A shovel assembly being configured to be removably coupled to an arm, said assembly comprising:
    a shovel being configured to be coupled to a forearm of a user thereby facilitating said shovel to be manipulated to shovel material, said shovel comprising:
        a blade having a front edge, a back edge, a top surface and a bottom surface, said front edge being configured to engage the material thereby facilitating the material to be supported on said top surface, said shovel curving upwardly adjacent to said back edge,
        a saddle extending away from said back edge of said blade wherein said saddle is configured to insertably receive the user's forearm, said saddle having a distal edge with respect to said blade, a first side, a second side and an inwardly facing surface, said saddle having an opening extending therethrough, said opening being aligned with said bottom surface of said blade,
        a grip being coupled to said saddle wherein said grip is configured to be gripped, said grip extending between said first side and said second side of said saddle, said grip being positioned closer to said blade than said distal edge of said saddle; and
    a support being coupled to said shovel wherein said support is configured to be secured to the user's forearm thereby facilitating said shovel to be retained on the user's forearm, said support comprising:
        a rod being coupled between said saddle and said blade, said rod being positioned within said saddle and extending outwardly though said opening in said saddle, said rod extending along said bottom surface of said blade, said rod extending outwardly beyond said distal edge of said saddle, said rod having a distal end with respect to said saddle, a strap being coupled to said rod, said strap being positioned adjacent to said distal end of said rod wherein said strap is configured to be wrapped around the user's forearm, said strap being matable to itself wherein said strap is configured to secure said support to the user's forearm, and a plurality of fasteners, each of said fasteners extending through said blade and said rod such that said rod is coupled to said blade wherein said rod is configured to transfer a load of the material to the user's forearm when said shovel is worn.

\* \* \* \* \*